United States Patent Office 3,794,658
Patented Feb. 26, 1974

3,794,658
SUBSTITUTED NITROIMIDAZOLYLTHIADI-
AZOLINONES AND METHOD OF USING
THE SAME
Spencer Douglas Carter, Trenton, and Gerald Berkelhammer, Princeton, N.J., assignors to American Cyanamid Company, Stamford, Conn.
No Drawing. Filed Mar. 20, 1972, Ser. No. 236,232
Int. Cl. C07d 99/10
U.S. Cl. 260—302 H        5 Claims

ABSTRACT OF THE DISCLOSURE

Preparation of nitroimidazolylthiadiazolinones and a method for controlling coccidiosis in warm-blooded animals by orally administering to said animals an edible carrier containing an effective amount of a nitroimidazolylthiadiazolinone, is described.

---

The novel nitroimidazolylthiadiazolinones of the present invention are represented by the formula:

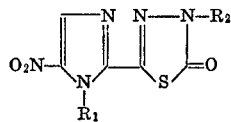

wherein $R_1$ is a member selected from the group consisting of methyl, ethyl and β-hydroxyethyl; $R_2$ is a member selected from the group consisting of alkyl ($C_1$–$C_4$), allyl,

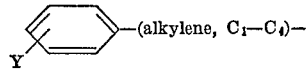

and alkoxyalkyl represented by the structure $$R_3\text{—O—}R_4$$

where $R_3$ is alkylene ($C_1$–$C_4$) and $R_4$ is alkyl ($C_1$–$C_4$) and Y is a member selected from the group consisting of halogen (Cl, F, Br and I), alkyl ($C_1$–$C_4$), nitro and alkoxy ($C_1$–$C_4$).

In accordance with the invention, the above-identified compounds can be prepared by reacting the appropriately substituted-1,3,4-thiadiazol-5-ol (U.S. Pat. 3,452,034) having the structure:

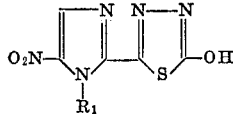

wherein $R_1$ is methyl, ethyl or β-hydroxyethyl; with a strong base such as an alkali metal alkoxide ($C_1$–$C_4$), alkali metal hydroxide, alkaline earth metal hydroxide (e.g., calcium or barium hydroxide) or organic base such as triethylamine, trimethylamine, pyridine or piperidine. Preferred bases are sodium and potassium alkoxides ($C_1$–$C_4$), sodium and potassium hydroxide and the trialkylamines mentioned above. The reaction is carried out at a temperature between about 20° and 100° C. in the presence of a solvent such as a lower saturated alkyl alcohol ($C_1$–$C_4$), ether such as diethylether or tetrahydrofuran or in a hydrocarbon solvent such as xylene, toluene or benzene. This reaction yields a salt, corresponding to the substituted 1,3,4-thiadiazol-5-ol illustrated above, which can be recovered from the reaction mixture by evaporation of the solvent. The residue from the evaporation is then redissolved in a solvent such as described above and the thus formed solution is then treated with a halide represented by the formula: $R_2X$ wherein X is halogen (e.g., Cl, Br, I or F) and $R_2$ is a member selected from the group consisting of alkyl ($C_1$–$C_4$), allyl,

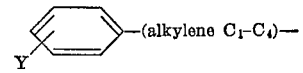

and $R_3$—O—$R_4$ where $R_3$ is alkylene ($C_1$–$C_4$) and $R_4$ is alkyl ($C_1$–$C_4$) and Y is a member selected from halogen, alkyl ($C_1$–$C_4$), nitro and alkoxy ($C_1$–$C_4$). The reaction mixture is heated to between 20° C. and 100° C. and the desired product recovered from said reaction mixture by evaporation of the solvent.

In an alternative procedure, the halide represented by $R_2X$ can be added to a prepared solution of the substituted 1,3,4-thiadiazol-5-ol in a solvent containing the base. Following addition of the halide, the reaction mixture is heated to between 20° C. and 100° C. and the solvent subsequently evaporated to yield the desired product.

In the instance where $R_1$=β-hydroxyethyl, it is best to employ, in either of the above procedures, equimolar quantities of the 1,3,4-thiadiazol-5-ol, the base and the alkylating agent to avoid etherification of the β-hydroxyethyl group.

Graphically these reactions may be shown as follows:

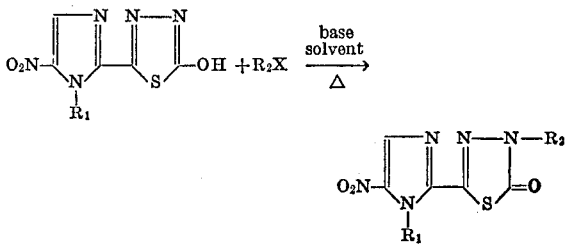

where $R_1$, $R_2$ and X are as defined hereinabove.

The compounds of this invention are highly effective anti-coccidial agents and may be used to prevent, control or treat coccidial infections in poultry, domestic, laboratory, farm or zoo animals.

In accordance with the invention, the method for combating coccidial infections involves orally administering to warm-looded animals either prophylactically or therapeutically an effective amount, i.e., in the range of 10 to 500 p.p.m., and preferably 20 to 50 p.p.m., of one of the compounds of the invention or a mixture of such compounds. These compounds may be effectively administered to the animals such as chickens, turkeys, ducks and other birds in their diet or drinking water.

For use in the diet, the compounds are usually made up in animal feed supplements which contain a relatively high percentage of the coccidiostat, for example, from about 1.0 to about 25 percent by weight thereof and generally from about 5.0 to 15 percent. The supplement is usually blended with the feed just prior to use or it may be added as a top dressing to the feed.

For use in drinking water the active material is generally dissolved or dispersed in a pharmaceutically acceptable carrier such as polyethyleneglycol containing a dispersant and/or surface active agent. The concentrate generally contains from about 5 to 250 p.p.m. of the active compound and is added to the animals' drinking water at the site of use.

SPECIFIC DESCRIPTION

The invention will be described in greater detail in conjunction with the examples set forth below which describes the preparation and testing of compounds of the invention.

EXAMPLE 1

Preparation of 4-methyl-2-(1-methyl-5-nitro-2-imidazolyl)-Δ²-1,3,4-thiadiazolin-5-one Methyl iodide (3.12 g.; 22 mmoles) is added to a solution of 5.0 g. (22 mmoles) of 2-(1-methyl-5-nitro-2-imidazolyl)-1,3,4-thiadiazol-5-ol- and 1.2 g. (22 mmoles) of sodium methylate in 100 ml. of methanol. The solution is heated at reflux for 2 hours. Twice during the heating period, excess methyl iodide (1 ml.) is added. The solid residue, obtained on evaporation under vacuum, is mixed with water, filtered, and washed with methanol. There is obtained 2.8 g. of the title compound, melting point 155–160° C. Recrystallization from 2-methoxyethanol yields orange crystals, melting point 168–170° C.

Following the procedure set forth above, but substituting allyl chloride, propyl chloride, n-butyl bromide, methoxymethyl iodide for methyl iodide yields respectively, 4-allyl-2-(1-methyl-5-nitro-2-imidazolyl)-Δ²-1,3,4-thiadiazolin-5-one;
4-propyl-2-(1-methyl-5-nitro-imidazolyl)-Δ²-1,3,4-thiadiazolin-5-one;
4-n-butyl-2-(1-methyl-5-nitro-2-imidazolyl)-Δ²-1,3,4-thiadiazolin-5-one and
4-methoxymethyl-2-(1-methyl-5-nitro-2-imidazolyl)-Δ²-1,3,4-thiadiazolin-5-one.

EXAMPLE 2

Preparation of 4-ethyl-2-(1-methyl-5-nitro-2-imidazolyl)-Δ²-1,3,4-thiadiazolin-5-one Sodium methylate (1.19 g.; 22 mmoles) is added to a mixture of 5.0 g. (22 mmoles) of 2-(1-methyl-5-nitro-2-imidazolyl)-1,3,4-thiadiazol-5-ol and 40 ml. of methanol. After a solution forms, the solvent is removed under a flow of nitrogen.

Ethanol (40 ml.) and 3.4 g. (22 mmoles) of ethyl iodide are added and the solution is heated at reflux for 3 hours. Twice during the heating period, excess ethyl iodide (2 ml.) is added. The solvent is removed by evaporation under vacuum and the solid residue is mixed with water and collected by filtration. Recrystallization of the crude solid form ethanol yields 5.2 g. of the title compound as brown-orange crystals, melting point 125–128° C. A second recrystallization from 2-methoxyethanol yields brown-orange prisms melting at 128–130° C.

Substituting potassium hydroxide or potassium t-butoxide for sodium methylate in the first step of the above process yields the potassium salt of 2-(1-methyl-5-nitro-2-imidazolyl)-1,3,4-thiadiazol-5-ol.

Similarly, in the following step isopropanol can be substituted for ethanol and ethoxyethyl chloride, m-methylbenzyl chloride, p-chlorobenzyl chloride, p-methoxybenzyl bromide or m-nitrobenzyl bromide for ethyl iodide to yield respectively, 4-ethoxyethyl-2-(1-methyl-5-nitro-2-imidazolyl)-Δ²-1,3,4-thiadiazolin-5-one;
4-m-methylbenzyl-2-(1-methyl-5-nitro-2-imidazolyl)-Δ²-1,3,4-thiadiazolin-5-one;
4-p-chlorobenzyl-2-(1-methyl-5-nitro-2-imidazolyl)-Δ²-1,3,4-thiadiazolin-5-one;
4-p-methoxybenzyl-2-(1-methyl-5-nitro-2-imidazolyl)-Δ²-1,3,4-thiadiazolin-5-one; or
4-m-nitrobenzyl-2-(1-methyl-5-nitro-2-imidazolyl)-Δ²-1,3,4-thiadiazolin-5-one.

EXAMPLE 3

Preparation of 4-benzyl-2-(1-methyl-5-nitro-2-imidazolyl)-Δ²-1,3,4-thiadiazolin-5-one Sodium methylate (1.19 g.; 22 mmoles) is added to a mixture of 5.0 g. (22 mmoles) of 2-(1-methyl-5-nitro-2-imidazolyl)-1,3,4-thiadiazol-5-ol and 40 ml. of methanol. After a solution forms, the solvent is removed under a flow of nitrogen.

Tetrahydrofuran (100 ml.) and 2.8 g. (22 mmoles) of benzyl chloride are added and the mixture is heated at reflux for 18 hours. Evaporation under vacuum yields a solid residue which is mixed with water and filtered. After washing with ethanol, there is obtained 6.2 g. of the title compound, melting point 204–208° C. Recrystallization from 2-methoxyethanol yields reddish-brown needles, melting point 206–208° C.

EXAMPLE 4

Preparation of 4-methyl-2-(1-ethyl-5-nitro-2-imidazolyl)-Δ²-1,3,4-thiadiazolin-5-one Methyl iodide (2.3 g.; 16 mmoles) is added to a solution of 0.4 g. (1.7 mmoles) of 5-(1-ethyl-5-nitro-2-imidazolyl)-1,3,4-thiadiazol-2-ol and 0.092 g. (1.7 mmoles) of sodium methylate in 10 ml. of methanol. The solution is heated at reflux for 2.5 hours. Twice during the heating period, excess methyl iodide (1 ml.) is added. The solvent is removed by evaporation under vacuum and the solid residue is mixed with water and filtered. There is obtained 0.4 g. of the title compound, melting point 140–145° C. Recrystallization from ethanol affords orange needles, melting point 150–153° C. A second recrystallization from 2-methoxyethanol increases the melting point to 152–153.5° C.

Following the above procedure but substituting 5-(1-β-hydroxyethyl-5-nitro-2-imidazolyl)-1,3,4-thiadiazol-2-ol for 5-(1-ethyl-5-nitro-2-imidazolyl)-1,3,4-thiadiazol-2-ol, in the above reaction yields 4-methyl-2-(1-β-hydroxyethyl-5-nitro-2-imidazolyl)-Δ²-1,3,4-thiadiazolin-5-one. Similarly, if ethyl iodide, benzyl iodide or allyl iodide is substituted for methyl iodide and 5-(1-β-hydroxyethyl-5-nitro-2-imidazolyl)-1,3,4-thiadiazol-2-ol is used, the following compounds are obtained:

4-ethyl-2-(1-β-hydroxyethyl-5-nitro-2-imidazolyl)-Δ²-1,3,4-thiadiazolin-5-one;
4-benzyl-2-(1-β-hydroxyethyl-5-nitro-2-imidazolyl)-Δ²-1,3,4-thiadiazolin and
4-allyl-2-(1-β-hydroxyethyl-5-nitro-2-imidazolyl)-Δ²,1,3,4-thiadiazolin-5-one.

EXAMPLE 5

*E. tenella*—Prophylactic

In the following tests, 1125 Rhode Island Red male X Barred Rock female cross cockerels, 7 days old and of approximately equal size and weight, were divided into groups comprising from 5 to 20 chicks per group. These groups were placed in separate cages with wire floors. A broiler feed diet of the formulation set forth below and having graded levels of test medicament intimately blended therewith was prepared and administered to the various groups. The formulation used was as follows:

FORMULATION

| | Lbs./ton |
|---|---|
| Corn yellow, fine ground | 1200 |
| Soybean, fine ground | 400 |
| Corn gluten meal | 100 |
| Fish meal | 100 |
| Alfalfa meal | 40 |
| Distillers solubles | 50 |
| Mico mix 8009 Limecrest+MnSO₄ | 40 |
| Bone meal (steamed) | 30 |
| NaCl | 10 |
| Choline chloride (25%) | 2 |
| Fortafeed (2–49C) | 2 |
| 2 g. riboflavin. | |
| 4 g. pantothenic/lb. | |
| 9 g. niacin. | |
| 10 g. choline. | |
| Vitamin A+D, dry | 2 |
| 2,000 μ/g. D₃. | |
| 10,000 μ/g. A. | |
| Profactor=B, 10 mg./ton. | |

The medicated and unmedicated diets were presented to the chicks and the chicks were permitted to feed and drink ad libitum from two days prior until 7 days following the oral inoculation with sporulated oocysts of *Eimeria tenella*. The number of oocysts inoculated directly into the crops of all chicks in the test was sufficient to produce severe intestinal lesions and 80% mortality in the untreated controls as determined prior to the time of inoculation by giving graded quantities of oocysts to comparable birds. Seven days following inoculation the test was terminated and the mortality rate recorded for each group.

All birds were necropsied and the number in each group with reduced intestinal lesions determined by examination of the intestinal tracts. Criteria for activity were percent survival and the number of birds with markedly reduced lesions in the small intestine (fewer than 100 pinpoint lesions localized immediately around the yolk stalk) relative to the uninfected unmedicated controls. Lesions in the untreated controls were so abundant and extensive as to be uncountable and produced a very severe hemorrhagic enteritis.

Data obtained appear in Table I below along with data obtained by the procedure of Example 6.

EXAMPLE 6

*E. acervulina*—Prophylactic

In determining the efficacy of the compounds against the infective organism *E. acervulina* (one of the etiological agents causing intestinal coccidiosis in chickens), Rhode Island Red male X Barred Rock female cross cockerels, 7 days old, were randomly divided into groups each comprising 5 to 20 chicks. These groups were caged in separate units and given free access to feed and water. The diet employed was a broiler feed of the formulation given in Example 5 to which had been added graded levels of test compound. Two days after presentation of the prescribed diets to the various groups, all chicks were orally inoculated with about 600,000 sporulated oocysts of *E. acervulina*. The inoculated birds were returned to their cages and the diet was continued for 10 days until the experiment was terminated. On termination, all birds were removed from their cages and weighed, and the weights were recorded. Mortality counts were made and all birds were necropsied and the number in each group with reduced intestinal lesions determined by examination of the intestinal tracts. Data obtained are presented in Table I below.

TABLE I

| Structure | P.p.m. in diet | E. tenella Alive/total | E. tenella No. birds with reduced lesions | E. acervulina No. survivors with reduced lesions |
|---|---|---|---|---|
| [Structure 1: 1-methyl-2-(1-methyl-5-nitro-2-imidazolyl)-Δ²-1,3,4-thiadiazolin-5-one, R₂=CH₃] | 250 | 5/5 | 5 | 5 |
|  | 60 | 5/5 | 5 | 2 |
|  | 30 | 14/15 | 14 | 11 |
|  | 15 | 9/10 | 9 | 6 |
|  | 8 | 10/10 | 7 | 1 |
|  | 0 | 12/20 | 0 | 0 |
| [Structure 2: R₂=C₂H₅, R₁=CH₃] | 30 | 5/5 | 5 | 3 |
|  | 15 | 4/5 | 5 | 1 |
|  | 0 | 6/20 | 0 | 0 |
| [Structure 3: R₂=CH₂-C₆H₅, R₁=CH₃] | 30 | 3/5 | 0 | 3 |
|  | 0 | 7/20 | 0 | 0 |
| [Structure 4: R₂=CH₃, R₁=C₂H₅] | 30 | 5/5 | 5 | 3 |
|  | 15 | 5/5 | 5 | 0 |
|  | 0 | 4/20 | 0 | 0 |

What is claimed is:

1. A compound of the formula:

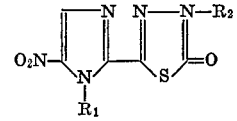

wherein $R_1$ is a member selected from the group consisting of methyl, ethyl and β-hydroxyethyl; $R_2$ is a member selected from the group consisting of alkyl ($C_1$–$C_4$), allyl,

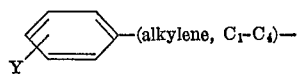

and —$R_3$—O—$R_4$ where $R_3$ is alkylene ($C_1$–$C_4$) and $R_4$ is alkyl ($C_1$–$C_4$) and Y is a member selected from the group consisting of halogen, alkyl ($C_1$–$C_4$), nitro and alkoxy ($C_1$–$C_4$).

2. The compound in accordance with claim 1, 4-methyl-2-(1-methyl - 5 - nitro - 2 - imidazolyl)-Δ²-1,3,4-thiadiazolin-5-one.

3. The compound in accordance with claim 1, 4-ethyl-2-(1-methyl-5-nitro-2-imidazolyl)-Δ² - 1,3,4-thiadiazolin-5-one.

4. The compound in accordance with claim 1, 4-benzyl-2-(1-methyl - 5 - nitro - 2 - imidazolyl)-Δ²-1,3,4-thiadiazolin-5-one.

5. The compound in accordance with claim 1, 4-methyl-2-(1-ethyl - 5 - nitro - 2 - imidazolyl)-Δ²-1,3,4-thiadiazolin-5-one.

References Cited
UNITED STATES PATENTS
3,691,178    9/1972    Baldwin et al. _____ 260—302 H RICHARD J. GALLAGHER, Primary Examiner U.S. Cl. X.R.

424—270